United States Patent [19]

Iwata et al.

[11] Patent Number: 4,597,459
[45] Date of Patent: Jul. 1, 1986

[54] WEIGHT DETECTING TYPE SENSOR

[75] Inventors: Yoshiki Iwata, Yokohama; Nobuo Kawase, Sagamihara; Yoshinori Tanaka, Sekiyado; Takashi Miyake, Kurume; Hiroshi Kawaura, Yokohama, all of Japan

[73] Assignee: Canon Kabushiki Kaisha, Tokyo, Japan

[21] Appl. No.: 675,754

[22] Filed: Nov. 28, 1984

[30] Foreign Application Priority Data

Nov. 30, 1983 [JP] Japan ................. 58-226231

[51] Int. Cl.4 .................. G01G 3/14; G01G 7/00
[52] U.S. Cl. .................. 177/210 R; 177/212; 177/DIG. 5; 177/50; 177/210 EM
[58] Field of Search ........... 177/210 R, 210 EM, 212, 177/DIG. 5, 155, 50

[56] References Cited

U.S. PATENT DOCUMENTS 3,685,603  8/1972  Codina .................... 177/DIG. 5
4,329,881  5/1982  Schloss .................. 177/210 R X
4,509,609  4/1985  Meiring ................... 177/50 X Primary Examiner—E. A. Goldberg
Assistant Examiner—Patrick W. Foster
Attorney, Agent, or Firm—Fitzpatrick, Cella, Harper & Scinto

[57] ABSTRACT

A weight detecting type sensor comprising a roller capable of partly jutting out upwardly from the surface of a body conveying belt, a strut rotatably supporting the roller and having a through-aperture at a portion thereof, a sensor having an optical axis associated with the through-aperture formed in the strut, and a pair of magnets disposed below the bottom of the strut.

1 Claim, 4 Drawing Figures

WEIGHT DETECTING TYPE SENSOR

BACKGROUND OF THE INVENTION

1. Field of the Invention

This invention relates to a weight detecting type sensor, and particularly to a wafer sensor conveniently usable to detect the arrival of a wafer at a desired position in a wafer conveying process.

2. Description of the Prior Art

Various apparatuses such as a coater for applying photoresist to wafers, an aligner for transferring circuit patterns to the wafers having the photoresist applied to them and a developer for developing the wafers having the circuit patterns transferred to them are used to manufacture semiconductor elements such as IC (integerated circuits) and LSI (large scale integrated circuits).

In these various apparatuses, wafers are placed one by one on a processing line, and a wafer cassette containing several tens of wafers is set at the beginning of the processing line so that the wafers are supplied one by one from this cassette to the processing line.

Additionally, a wafer cassette is also set at the terminating point of the processing line and is capable of containing several tens of wafers. For this reason, a wafer supply device and a wafer receiving device called a sender and a receiver, respectively, are disposed at the starting point and the terminating point of the processing line of each apparatus.

Further, a device called a buffer for temporarily containing wafers at an intermediate location on the wafer processing line and again placing them onto the processing line after a predetermined time is disposed at the intermediate location, and a wafer cassette capable of receiving several tens of wafers is also set at that location.

Now, in the sender, receiver and buffer as previously described, the wafer cassettes are adapted to be successively moved up or down after a wafer has been supplied onto the processing line or after the wafer has been received from the processing line. In each case, when a wafer has become positioned on a predetermined conveyor belt in the wafer cassette, the driving of the conveyor belt is stopped or started in response thereto.

Various types of wafer sensors have previously been used to detect whether a wafer rests on the conveyor belt. Typical examples of such wafer sensors are reflecting type (air reflecting type and light reflecting type) sensors and weight detecting type sensors.

The air reflecting type wafer sensor utilizes the phenomenon that air is blown against the back of a wafer and a turbulent flow is created when the air impinges on the wafer, but dust is blown up by the detecting air stream and contaminates the atmosphere around the wafer.

On the other hand, the light reflecting type wafer sensor utilizes the reflection of light incident on to the back of a wafer to detect whether the wafer rests on a conveyor belt at a predetermined position. However, sensors of this type have a disadvantage that the adjustment of sensitivity must be effected in conformity to the smoothness and surface-treated state of the reflecting surface of the wafer and operation is cumbersome.

The weight detecting type wafer sensor does not suffer from the disadvantages as described above. FIG. 1 of the accompanying drawings schematically shows a conventional weight detecting type wafer sensor.

FIG. 1A shows a state in which a wafer 1 has arrived at the vicinity of the sensor with the aid of a conveyor belt 2. The wafer 1 is thereafter conveyed to the left by the conveyor belt 2 as viewed in FIG. 1A and therefore, the leading end edge portion of the wafer rides onto a vane member 3 of the sensor which juts out upwardly. At this time the vane member 3 rotates about a pivot 4 as the wafer 1 advances, and as shown in FIG. 1B, the end portion of the wafer crosses a light transmitting type sensor 5. Thus, it is detected that the wafer 1 rests on the conveyor belt at a predetermined position. However, the wafer 1 is liable to be damaged by its sliding contact with the vane member 3 when it passes over the sensor. In addition, when the diameter and weight of the wafer vary, it is necessary to change the position of the pivot 4 of the vane member 3 or change the curvature of the contact portion of the vane member, and this has led to a disadvantage that adjustment is very cumbersome.

SUMMARY OF THE INVENTION

It is therefore an object of the present invention to provide a wafer sensor which can prevent wafers from being damaged or contaminated.

It is another object of the present invention to provide a wafer sensor in which the adjustment dependent on the weight of a wafer to be conveyed can be easily accomplished.

BRIED DESCRIPTION OF THE DRAWINGS

DESCRIPTION OF THE PREFERRED EMBODIMENT

A preferred embodiment of the present invention will be described below by reference to FIG. 2.

Figure 1A:
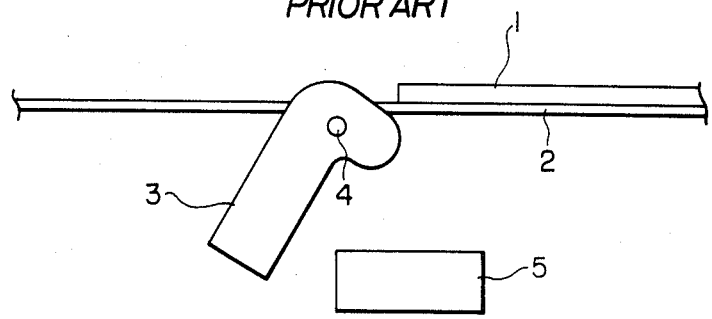
FIGS. 1A and 1B show a conventional weight detecting type wafer sensor in a state in which a wafer does not rest on the sensor and a state in which the wafer rests on the sensor, respectively.
Figure 1B:
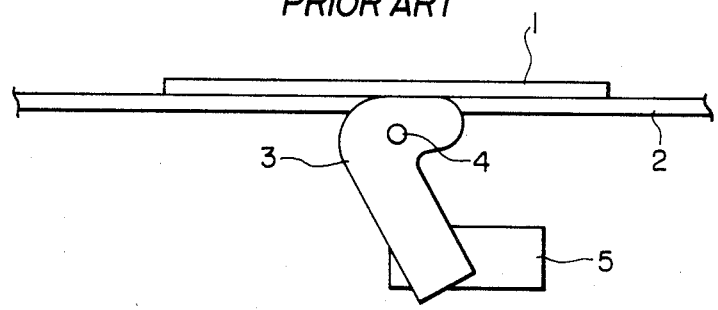
Figure 2A:
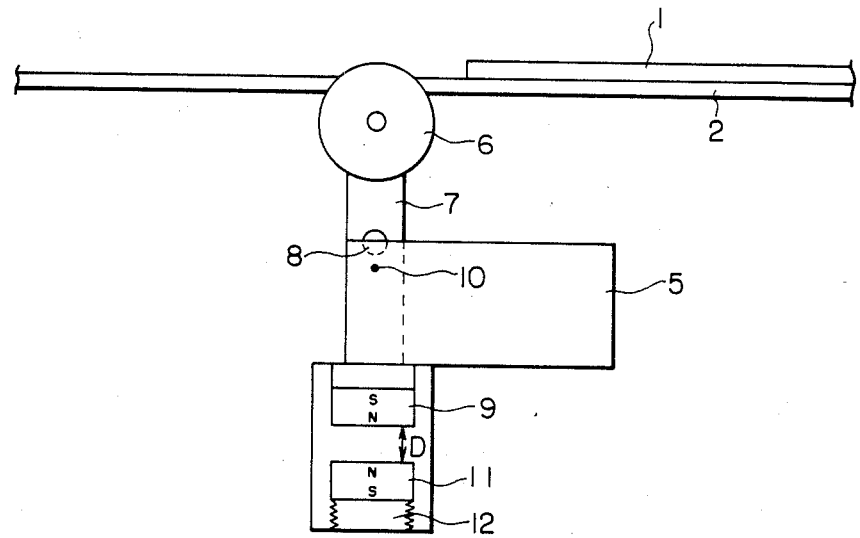
FIGS. 2A and 2B show the weight detecting type wafer sensor of the present invention in a state in which a wafer does not rest on the sensor and a state in which the wafer rests on the sensor, respectively.
Figure 2B:
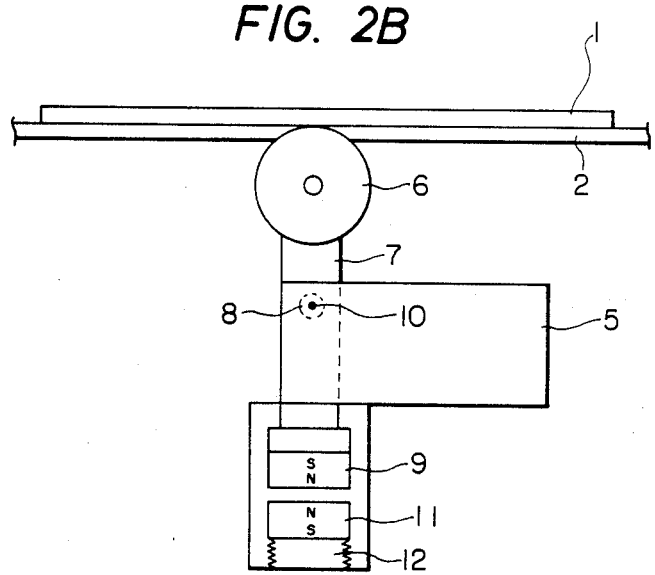

FIGS. 2A and 2B are schematic views of a weight detecting type sensor constructed in accordance with the present invention, FIG. 2A showing a state in which a wafer 1 has arrived at the vicinity of the sensor with the aid of a conveyor belt 2. As is apparent from FIG. 2, the weight detecting type sensor of the present invention has a roller 6 rotatably supported on the upper portion of a strut 7. The strut 7 is formed with a through-aperture 8 in its intermediate portion and has a magnet 9 mounted at its bottom. A light transmitting type sensor 5 is installed in proximity to the strut 7 so that the optical axis 10 of the sensor 5 is related to the through-aperture 8 of the strut 7. The sensor 5 is not limited to the light transmitting type but may also be of other types. A magnet 11 is disposed in opposed relationship with the magnet 9, and the same magnetic poles (N poles in the drawing) of the magnets 9 and 11 are opposed to each other. A screw member 12 for varying the distance D between the magnets 9 and 11 is mounted below the magnet 11.

According to the construction of the sensor of the present invention, the upper portion of the roller 6 usually juts up from the plane of two parallel belts 2 at the lateral central position of the belts 2 due to the repulsion between the magnets 9 and 11. Accordingly, when the wafer 1 placed on the two belts 2 approaches the roller 6 by the driving of the belts 2, the leading end edge portion of the wafer 1 advances to the left as viewed in FIG. 2 while riding onto the upper portion of the roller 6. At this time, the roller 6 is rotated by the contact with the back of the wafer 1 and also is pushed down vertically due to the weight of the wafer 1. However, since the strut 7 is biased upwardly by the repulsion between the magnets 9 and 11, the peripheral surface of the roller 7 remains flush with the upper surfaces of the belts 2 and maintains contact with the back of the wafer 1 (FIG. 2B).

Further, in the state shown in FIG. 2B, the through-aperture 8 of the strut 7 is coincident with the optic axis 10 of the sensor 5 and thus, the sensor 5 is actuated. By the sensor 5 thus being actuated the position of the wafer 1 at a desired location on the roller 6 is detected.

Accordingly, in the case of a receiver, it can be known that the wafer has been received at a desired position in a wafer cassette, and the driving of the belts is stopped, after which the cassette is moved up or down.

In the case of a sender, when the wafer is placed in the state shown in FIG. 2B by upward or downward movement of the wafer cassette, the sensor 5 operates to start the driving of the belts and to supply the wafer onto the processing line.

In the present invention, the adjustment in accordance with the variation in the weight of the wafer is accomplished by varying the distance D between the magnets 9 and 11 by the use of the screw member 12. That is, it will be apparent that the repulsion force between the magnets 9 and 11 obtained by selecting the distance D must be smaller than the weight of the wafer 1 and must be of a sufficient magnitude to cause a part of the roller to jut up above the upper surface of the belts 2 in the state in which the wafer 1 does not rest on the roller 6.

As described above, the weight detecting type sensor of the present invention does not damage the wafer because the surface of the wafer and the roller are in rotative contact with each other, and also has an advantage that the adjustment dependent on the weight of the wafer is very simple.

While description has been made with respect to a case where the weight detecting type sensor of the present invention is applied to the manufacture of semiconductors, it will be apparent to those skilled in the art that the sensor of the present invention may also be used to detect the weights of other bodies.

What we claim is:

1. A weight detecting type sensor for detecting a body conveyed on a body conveying belt, said sensor comprising:
    a rotatable member mounted so that at least a portion thereof can project upwardly above the surface of the body conveying belt;
    a strut mounting said rotatable member as aforesaid and having an aperture therethrough at a portion thereof;
    a sensor having an optical axis associated with said aperture formed in said strut;
    biasing means including a pair of magnets disposed below the bottom of said strut, for imparting an upwardly directed biasing force to said strut; and
    means for adjusting the distance between said pair of magnets.

* * * * *